(12) United States Patent
Jin et al.

(10) Patent No.: US 9,874,960 B2
(45) Date of Patent: Jan. 23, 2018

(54) TOUCH SCREEN, METHOD FOR MANUFACTURING THE SAME, AND DISPLAY DEVICE

(71) Applicant: BOE Technology Group Co., Ltd., Beijing (CN)

(72) Inventors: Choi-Seung Jin, Beijing (CN); Jing Niu, Beijing (CN); Shuang Sun, Beijing (CN); Fangzhen Zhang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 14/771,618

(22) PCT Filed: Sep. 26, 2014

(86) PCT No.: PCT/CN2014/087532
§ 371 (c)(1),
(2) Date: Aug. 31, 2015

(87) PCT Pub. No.: WO2015/196606
PCT Pub. Date: Dec. 30, 2015

(65) Prior Publication Data
US 2017/0097708 A1     Apr. 6, 2017

(30) Foreign Application Priority Data

Jun. 24, 2014  (CN) .......................... 2014 1 0285927

(51) Int. Cl.
*G06F 3/041* (2006.01)
*C03C 15/00* (2006.01)
*C03C 17/23* (2006.01)

(52) U.S. Cl.
CPC ............ *G06F 3/0412* (2013.01); *C03C 15/00* (2013.01); *C03C 17/23* (2013.01); *G06F 2203/04103* (2013.01)

(58) Field of Classification Search
CPC . G06F 2203/04111; G06F 2203/04103; C03C 15/00; C03C 17/23
See application file for complete search history.

(56) References Cited

U.S. PATENT DOCUMENTS

2014/0144689 A1*   5/2014   Yuan ................... H05K 1/0289
                                                174/261

FOREIGN PATENT DOCUMENTS

CN        202404561 U      8/2012
CN        202904529 U      4/2013
(Continued)

OTHER PUBLICATIONS

International Search Report and Written Opinion for PCT Application No. PCT/CN2014/087532, dated Mar. 20, 2015, 9 pages.
(Continued)

*Primary Examiner* — Insa Sadio
(74) *Attorney, Agent, or Firm* — Westerman, Champlin & Koehler, P.A.

(57) ABSTRACT

The present invention has disclosed a touch screen, comprising: a substrate; at least one first electrode formed on the substrate; at least one second electrode formed on the substrate, the first electrode and the second electrode having different extending directions, and there being an intersecting area between a vertical projection of the first electrode on the substrate and a vertical projection of the second electrode on the substrate; and a first protection layer formed at least at the intersecting area between the first electrode and the second electrode; wherein, the substrate is provided with a groove at the intersecting area between the first (Continued)

electrode and the second electrode so as to at least receive therein a portion of the first electrode located within the intersecting area. The present invention has also disclosed a display device and a method for manufacturing the touch screen. The present invention is provided to prevent two electrodes in two different layers from electrically contacting with each other and to ensure the yield of the touch screen to some extent.

14 Claims, 3 Drawing Sheets

(56) References Cited

FOREIGN PATENT DOCUMENTS

| CN | 103425339 A | 12/2013 |
| CN | 103677418 A | 3/2014 |
| CN | 203535595 U | 4/2014 |
| CN | 103793092 A | 5/2014 |
| KR | 10-2012-0121573 A | 11/2012 |

OTHER PUBLICATIONS

English translation of Box No. V from the Written Opinion for the International Searching Authority for PCT Application No. PCT/CN2014/087532, 3 pages.

First Office Action, including Search Report, for Chinese Patent Application No. 201410285927.4, dated Jun. 27, 2014, 12 pages.

* cited by examiner

TOUCH SCREEN, METHOD FOR MANUFACTURING THE SAME, AND DISPLAY DEVICE

CROSS-REFERENCE TO RELATED APPLICATIONS

This application is a Section 371 National Stage Application of International Application No. PCT/CN2014/087532, filed 26 Sep. 2014, which claims the benefit of Chinese Patent Application No. 201410285927.4 filed on Jun. 24, 2014 in the State Intellectual Property Office of China, the whole disclosure of which is incorporated herein by reference.

BACKGROUND OF THE INVENTION

Field of the Invention

The present invention relates to a touch display technique field, and more particularly, relates to a touch screen, a method for manufacturing the same, and a display device.

Description of the Related Art

Recently, touch technology is widely used in various kinds of multi-media electronic products, especially in portable and mobile electronic products, such as a cellphone, an electronic book, a laptop and the like. The current input method using keyboard or mouse can be effectively replaced by touch technology used as a kind of input means. In addition to the convenience of operation, the touch input technology also has the advantage of performing its operation by means of intuition, which causes that such kind of technology has become a very popular human-machine interaction interface and a multi-media interactive way.

A traditional touch screen comprises an outmost protective glass, an intermediate touch screen and an inmost display screen. However, in One Glass Solution (OGS), a transparent touch electrode is directly formed on the outmost protective glass. That's to say, the OGS technology tries to integrate the outmost protective glass and the touch screen as a whole screen. As compared with the traditional touch technology, OGS technology has the following advantages: saving a layer of glass and reducing resultant adhesive cost; simplifying the structure and lowering the weight and thereby achieving a light and thin structure; and increasing light-transmittance. Since OGS technology can reduce the production cost, increase the production yield, satisfy the ultrathin requirements of smart terminal well and improve the display quality, such OGS technology has been increasingly applied into electronic devices, such as smart terminals.

FIG. 1 is a cross sectional view of an OGS touch screen produced based on the prior art. As shown in FIG. 1, in prior art, during the production of the OGS touch screen, the electrodes formed from transparent conductive films are disposed to be parallel to axes extending in two different directions, respectively. A first electrode 40 and a second electrode 50 extending in two different directions respectively are in the same plane on a substrate 10 and need to be electrically isolated from each other. The second electrode 50 extending in one direction need to be electrically connected as a whole by a bridge-connection portion 20 formed from transparent conductive bridge film at a position where the two axes intersect. The bridge-connection portion 20 is electrically isolated from the first electrode 40 by an insulated first protection layer 30. A second protection layer 60 is provided over the first electrode 40 and the second electrode 50. There is an overlapped portion, as shown by a circle A of FIG. 1, between the second electrode 50 and the bridge-connection portion 20. As such, if an unsteady electrical connection arises between the second electrode 50 and the bridge-connection portion 20 in engineering, the production yield of OGS screen will be lowered.

SUMMARY OF THE INVENTION

In order to solve the problems in prior arts, the present invention has provided a touch screen and a method for manufacturing the same, and a display device, which can reduce the area of electrical contact and improve the yield of the OGS touch screen.

According to one aspect of the present invention, there is provided a touch screen, comprising:
a substrate;
at least one first electrode formed on the substrate;
at least one second electrode formed on the substrate, the first electrode and the second electrode having different extending directions, and there being an intersecting area between a vertical projection of the first electrode on the substrate and a vertical projection of the second electrode on the substrate; and
a first protection layer formed at least at the intersecting area between the first electrode and the second electrode;
wherein the substrate is provided with a groove at the intersecting area between the first electrode and the second electrode so as to at least receive therein a portion of the first electrode located within the intersecting area.

In an embodiment, a depth of the groove is larger than a thickness of the first electrode.

In an embodiment, the first protection layer is formed within the groove.

In an embodiment, the touch screen comprises a plurality of first electrodes and a plurality of second electrodes, the first electrodes are arranged in parallel at regular interval, and the second electrodes are arranged in parallel at regular interval.

In an embodiment, the first electrode and the second electrode are both made from transparent conductive materials.

In an embodiment, an area of the first protection layer is at least larger than an area of the intersecting area.

According to a further aspect of the present invention, there is provided a display device comprising the touch screen according to any one of above embodiments.

According to a still further aspect of the present invention, there is provided a method for manufacturing a touch screen, comprising the following steps:
forming a groove in a substrate by etching;
forming at least one first electrode on the substrate formed with the groove in such a way that at least one portion of the first electrode is formed within the groove;
forming a first protection layer at least on the portion of the first electrode formed within the groove; and
forming at least one second electrode on the first protection layer, wherein, the second electrode has a different extending direction from that of the first electrode, and there is an intersecting area between a vertical projection of the second electrode on the substrate and a vertical projection of the at least one portion of the first electrode formed within the groove on the substrate.

In an embodiment, the first protection layer is formed within the groove.

In an embodiment, an area of the first protection layer is at least larger than an area of the intersecting area.

In the touch screen, the method for manufacturing the touch screen and the display device according to various embodiments of the present invention, since, in the intersecting area, the first electrode is fully provided within the groove, and the first electrode and the second electrode are not in the same plans and are provided without any interruption in the intersecting area, there is no need to provide a conductive bridge film used for preventing electrical contact from arising between the first electrode and the second electrode, thereby preventing the first electrode or the second electrode from electrically contacting with the conductive bridge film and reducing the probability of unsteady electrical connection in engineering and in turn ensuring the yield of the OGS screen to some extent.

DETAILED DESCRIPTION OF PREFERRED EMBODIMENTS OF THE INVENTION

For the purpose of making objects, technical solutions and advantages of the present invention clearer, the present invention will be further described in detail hereinafter with reference to the accompanying drawings and in combination with the preferred embodiments.

In the following detailed description, for the sake of easy understanding, a plurality of details have been set forth so as to provide a comprehensive understanding of the embodiments of the present disclosure. However, it is obvious that one or more embodiments can be carried out without these details. In other situations, the well-known structures and devices are embodied diagrammatically so as to simplify the attached drawings.

Figure 2:
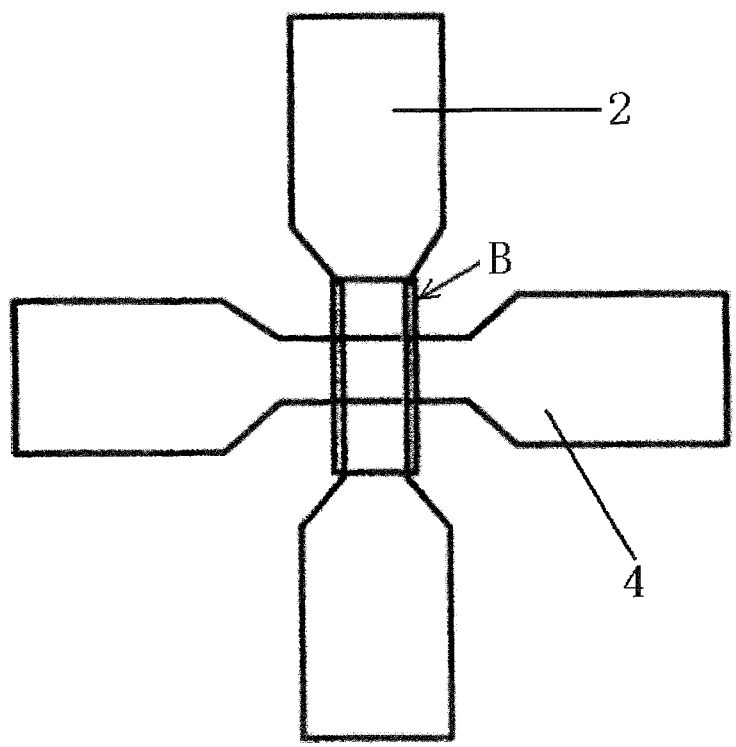
FIG. 2 is a top view schematically showing arrangement of electrodes of a touch screen according to an embodiment of the present invention.
Figure 3:
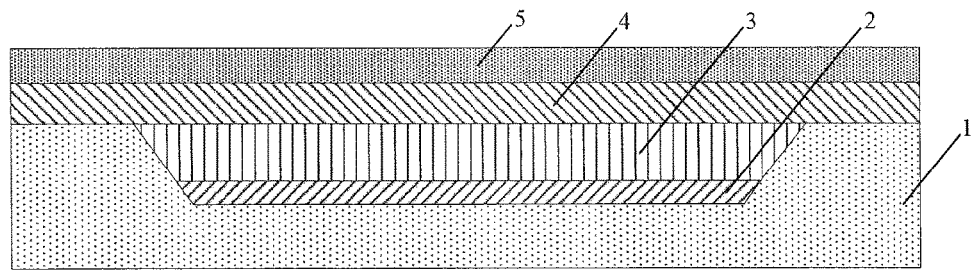
FIG. 3 is a partial sectional view of a touch screen according to an embodiment of the present invention.

FIG. 2 is a top view schematically showing arrangement of electrodes of a touch screen according to an embodiment of the present invention, and FIG. 3 is a partial sectional view of a touch screen according to an embodiment of the present invention. As shown in FIGS. 2 and 3, the touch screen includes a substrate 1, at least one first electrode 2, a first protection layer 3, at least one second electrode 4 and a second protection layer 5.

By using patterning process, the first electrodes 2 and the second electrodes 4 are both formed from conductive layers formed on the substrate 1. Optionally, the substrate 1 may be formed from any one of glass, silicon slice, quartz and plastic, for example, formed from glass.

The first electrode 2 and the second electrode 4 have different extending directions and the vertical projections thereof on the substrate 1 intersect with each other, for instance, the extending direction of the first electrode 2 and the extending direction of the second electrode 4 are perpendicular to each other. In an embodiment of the present invention, the first electrodes 2 are arranged in parallel at regular interval, and the second electrodes 4 are arranged in parallel at regular interval. There is no particular requirement about the detailed electrode structures and types of the first electrodes 2 and the second electrodes 4 in the present invention, as long as the structure and type thereof may facilitate the determination of the coordinate of the touch point, for example, the electrodes are strip-shaped electrodes. A plurality of strip-shaped electrodes of the first electrodes 2 and a plurality of strip-shaped electrodes of the second electrodes 4 are arranged in parallel at regular interval, respectively.

In this way, the first electrodes 2 and the second electrodes 4 intersect with each other so as to form a resistance network, and one of them act as a touch drive electrode and the other one of them acts as a touch induction electrode. During operation of the touch screen, when the first electrode 2 acting as the drive electrode is applied with a respective voltage, the second electrode 4 acting as a receiving electrode receives a steady current. When the finger touches the touch screen, an equivalent capacitance is formed between the finger and the touch screen, such that the current received by the receiving electrode is lowered. Finally, the coordinate of the touch point can be determined based on the current intensity received by the receiving electrode so as to realize the positioning of the touch.

The first electrodes 2 and the second electrodes 4 are both made from conductive materials. Optionally, the conductive materials are transparent conductive materials, such as Indium Tin Oxide (ITO) and the like. The first electrodes 2 and the second electrodes 4 may also be made from transparent conductive materials, such as Indium Zinc Oxide (IZO), Indium Tin Zinc Oxide (ITZO), Tin Oxide (TO) and the like.

As shown in FIG. 2, the first protection layer 3 is formed between the first electrode 2 and the second electrode 4, at least at a position where the first electrode 2 and the second electrode 4 overlap with each other, i.e. at an intersecting area B between the first electrode 2 and the second electrode 4. Certainly, in practice, in addition to this position, the first protection layer 3 may also be formed at other positions on the first electrode 2. However, it should be noted that no matter where the first protection layer 3 is formed, it must cover a corresponding position of the first electrode 2 intersecting with the second electrode 4, that's to say, an area of the first protection layer 3 must be at least larger than an area of the intersecting area B so as to block any electrical connection between the first electrode 2 and the second electrode 4 and lower the defective rate of the touch screen caused by unsteady electrical connection in engineering.

The first protection layer 3 is made from a non-conductive material so as to electrically isolate the first electrode 2 from the second electrode 4 and prevent electrical connection from arising therebetween.

Optionally, the thickness of the first protection layer 3 is 1~3 μm and may be selected as appropriate in practice.

Figure 1:
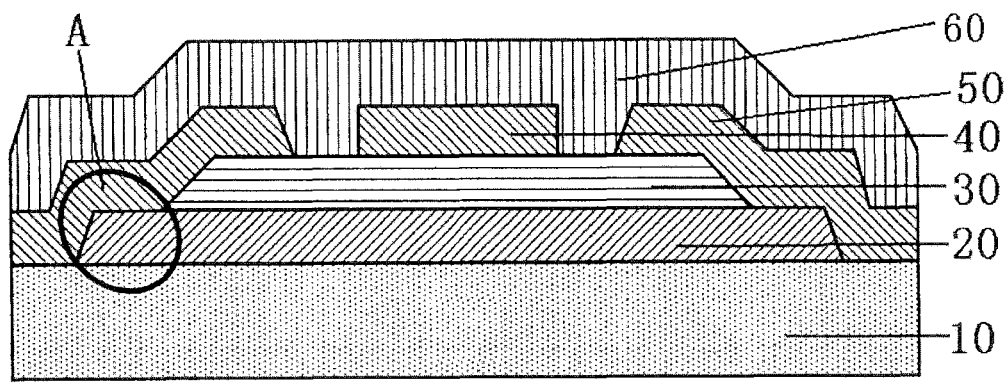
FIG. 1 is a partial sectional view of a OGS screen according to prior art.

Since the first protection layer 3 fully covers the intersecting area B between the first electrode 2 and the second electrode 4, there is no particular requirement about the second electrode 4 in the present invention, as long as the second electrode 4 can meet the requirement of non-interruption. In this way, there is no need to provide a conductive bridge film used for preventing electrical contact from arising between the first electrode and the second electrode as shown in FIG. 1, thereby preventing the second electrode 4 from electrically contacting with the conductive bridge film. Furthermore, the first electrodes 2 and the second electrodes 4 can be simply formed by one-time pattering process so as to simplify the manufacturing process.

The second protection layer 5 is formed over the second electrode 4. The second protection layer 5 is also made from a non-conductive material.

In an embodiment of the present invention, a groove is provided at the intersecting area B between the first electrode 2 and the second electrode 4. There is no particular limitation to a shape of the groove, as long as an area of the groove is not less than the area of the intersecting area, and a depth of the groove is larger than a thickness of the first electrode 2, thereby the groove at least receives a portion of the first electrode 2 located within the intersecting area B therein. In this way, when the first electrode 2 is formed on the substrate 1, the first electrode 2 is fully recessed into the groove at a corresponding position (i.e. the intersecting area B) where the first electrode 2 intersects with the second electrode 4. That's to say, the first electrode 2 fully runs through the groove, and then the first protection layer 3 and the second electrode 4 extending in another direction are formed on the first electrode 2. In an embodiment, the area of the first protection layer 3 is at least more than the area of the intersecting area B or the area of the groove, that's to say, the first protection layer 3 can fully cover the intersecting area B or the portion of the first electrode 2 located within the groove. In this way, there is no any electrical connection between the first electrode 2 and the second electrode 4 due to the insulated protection of the first protection layer 3, as shown in FIG. 3, so as to avoid some bad situations, such as unsteady situation in engineering.

In the touch screen according to anyone of above embodiments of the present invention, since, in the intersecting area B, the first electrode 2 is fully provided within the groove and the first electrode 2 and the second electrode 4 are not in the same plane and are provided without any interruption in the intersecting area B, there is no need to provide the conductive bridge film used for preventing electrical contact from arising between the first electrode and the second electrode as shown in FIG. 1, thereby preventing the first electrode 2 or the second electrode 4 from electrically contacting with the conductive bridge film and reducing the probability of unsteady electrical connection in engineering and in turn ensuring the yield of the OGS screen to some extent.

According to another aspect of the present invention, there is also provided a display device including the above-mentioned touch screen. The display device may be a mobile phone, a tablet computer, a TV, a display, a laptop, a digital picture frame, a navigator, an electronic paper and any other products or component having display functions. The display device may be a transparent display panel mounted onto a door, a wall, a worktable and various household appliances.

Figure 4A:
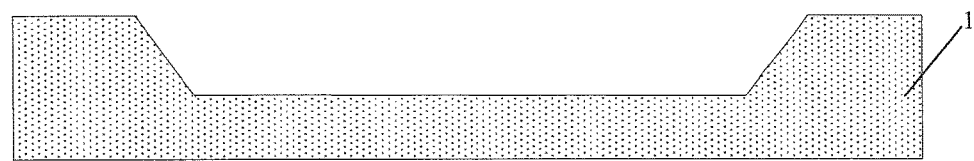
FIGS. 4A to 4E are illustrative views of process steps of a method for manufacturing a touch screen according to an embodiment of the present invention.
Figure 4B:
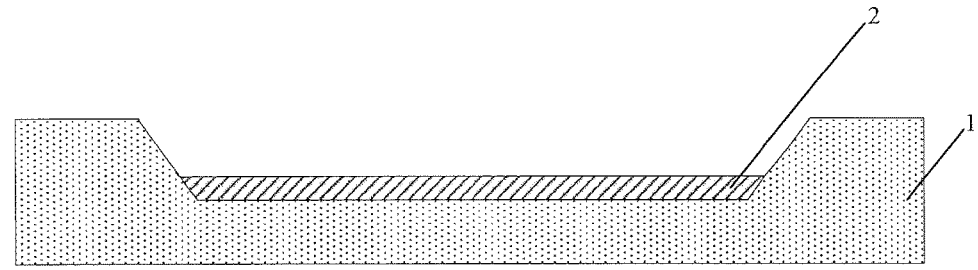
Figure 4C:
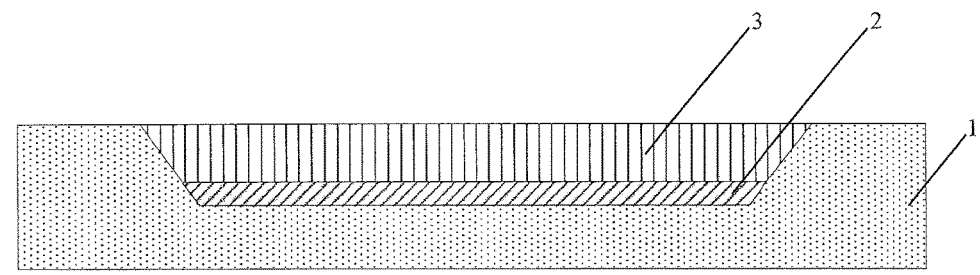
Figure 4D:
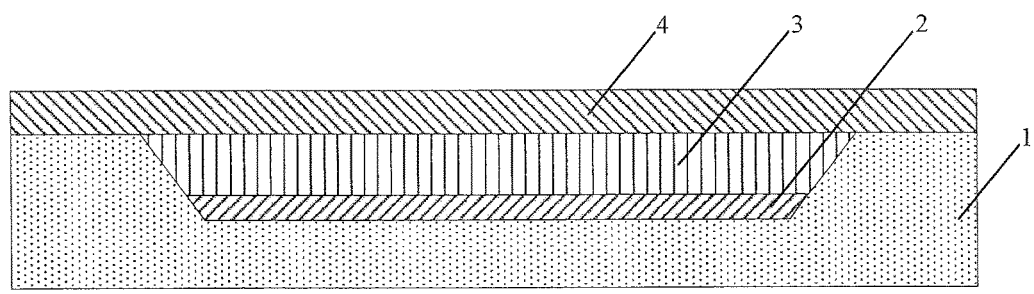

According to a further aspect of the present invention, there is provided a method for manufacturing a touch screen, which comprises the following steps:

forming a groove in a substrate 1 by etching (see FIG. 4a); optionally, the material for producing the substrate 1 comprises glass, silicon slice, quartz, plastic and the like, for example, is glass;

forming at least one first electrode 2 on the substrate 1 formed with the groove in such a way that at least one portion of the first electrode 2 is formed within the groove (see FIG. 4B);

forming a first protection layer 3 at least on the portion of the first electrode 2 formed within the groove (see FIG. 4C);

forming at least one second electrode 4 on the first protection layer 3, wherein, the second electrode 4 has a different extending direction from that of the first electrode 2, and there is an intersecting area between a vertical projection of the second electrode 4 on the substrate and a vertical projection of the at least one portion of the first electrode 2 formed within the groove on the substrate (see FIG. 4D); in this way, the first electrode 2 is fully recessed into the groove in the intersecting area, that's to say, the portion of the first electrode 2 intersecting and overlapping with the second electrode 4 fully runs through the groove.

Figure 4E:
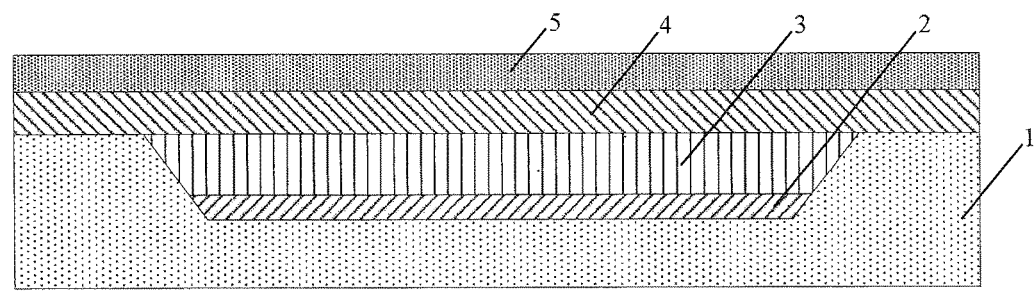

In addition, a second protection layer 5 is formed over the second electrode 4 (see FIG. 4E).

In the above method, the first electrode 2 and the second electrode 4 have different extending directions, for instance, the extending direction of the first electrode 2 and the extending direction of the second electrode 4 are perpendicular to each other, and there is an intersecting area between the vertical projection of the first electrode 2 on the substrate 1 and the vertical projection of the second electrode 4 on the substrate 1.

The first protection layer 3 is at least located at a position where the first electrode 2 and the second electrode 4 intersect with each other, i.e. at the intersecting area B between the first electrode 2 and the second electrode 4 (see FIG. 2). Certainly, in practice, the first protection layer 3 may also be formed at other positions of the first electrode 2. However, it should be noted that no matter where the first protection layer 3 is formed, it must cover on a corresponding position of the first electrode 2 intersecting with the second electrode 4, i.e. an area of the first protection layer 3 must be at least larger than an area of the intersecting area between the first electrode 2 and the second electrode 4 so as to block any electrical connection between the first electrode 2 and the second electrode 4 and lower the defective rate of the touch screen caused by unsteady electrical connection in engineering.

The first electrodes 2 and the second electrodes 4 are both made from conductive materials. Optionally, the conductive materials are transparent conductive materials, such as Indium Tin Oxide (ITO) and the like.

The first protection layer 3 is made from a non-conductive material so as to electrically isolate the first electrode 2 from the second electrode 4 and prevent electrical connection from arising therebetween. The second protection layer 5 is also made from a non-conductive material. Optionally, the thickness of the first protection layer 3 is 1~3 nm and may be selected as appropriate in practice.

In various process steps of the method for manufacturing the touch screen according to an exemplary embodiment as shown in FIG. 4A-4E, a groove is formed in the substrate 1 at the position where the first electrode 2 intersects with the second electrode 4 so as to achieve absolute isolation between the first electrode 2 and the second electrode 4. Since the first protection layer 3 fully covers the intersecting area between the first electrode 2 and the second electrode 4, it is only required to provide the second electrode 4 without any interruption in this method.

In an embodiment of the present invention, the first electrodes 2 and the second electrodes 4 both comprise a plurality of electrodes arranged at regular interval. There is no particular requirement about the detailed structures and types of the electrodes of the first electrodes 2 and the second electrodes 4 in the present invention, as long as the structures and types thereof may facilitate the determination of the coordinate of the touch point, for example, the electrodes are strip-shaped electrodes. Furthermore, a plurality of strip-shaped electrodes of the first electrodes 2 and a plurality of strip-shaped electrodes of the second electrodes 4 are arranged in parallel at regular interval, respectively.

In the touch screen and the method for manufacturing the touch screen, and the display device according to above various embodiments of the present invention, since, in the intersecting area, the first electrode is fully provided within the groove and the first electrode and the second electrode are not in the same plane and are provided without any interruption in the intersecting area, there is no need to provide the conductive bridge film used for preventing electrical contact from arising between the first electrode and the second electrode, thereby preventing the second electrode from electrically contacting with the conductive bridge film in a different layer and reducing the probability of unsteady electrical connections in engineering and in turn ensuring the yield of the OGS screen to some extent.

The objects, technical solutions and advantages of the present invention have been described in detail with reference to the above detailed embodiments. However, it should be appreciated by those skilled in the art that the described embodiments are merely to name some exemplary embodiments of the present invention, rather than to limit the present invention thereto. Any change, improvement and equivalent without departing from the principles and spirit of the disclosure should fall into the scope of the present invention.

What is claimed is:

1. A touch screen, comprising:
    a substrate;
    at least one first electrode formed on the substrate;
    at least one second electrode formed on the substrate, the first electrode and the second electrode having different extending directions, and there being an intersecting area between a vertical projection of the first electrode on the substrate and a vertical projection of the second electrode on the substrate; and
    a first protection layer formed at least at the intersecting area between the first electrode and the second electrode;
    wherein the substrate is only provided with a groove at the intersecting area between the first electrode and the second electrode, in which groove a portion of the first electrode located within the intersecting area is received, with other portions of the first electrode being formed on a surface of the substrate rather than being formed into the substrate; and
    wherein the first electrode and the second electrode are provided without any interruption in the intersecting area.

2. The touch screen according to claim 1, wherein a depth of the groove is larger than a thickness of the first electrode.

3. The touch screen according to claim 2, wherein the first protection layer is formed within the groove.

4. The touch screen according to claim 3, wherein, an area of the first protection layer is at least larger than an area of the intersecting area.

5. The touch screen according to claim 2, wherein, an area of the first protection layer is at least larger than an area of the intersecting area.

6. The touch screen according to claim 1, wherein the touch screen comprises a plurality of first electrodes and a plurality of second electrodes, the first electrodes are arranged in parallel at regular interval, and the second electrodes are arranged in parallel at regular interval.

7. The touch screen according to claim 6, wherein, an area of the first protection layer is at least larger than an area of the intersecting area.

8. The touch screen according to claim 1, wherein the first electrode and the second electrode are both made from transparent conductive materials.

9. The touch screen according to claim 8, wherein, an area of the first protection layer is at least larger than an area of the intersecting area.

10. The touch screen according to claim 1, wherein, an area of the first protection layer is at least larger than an area of the intersecting area.

11. A display device comprising the touch screen according to claim 1.

12. A method for manufacturing a touch screen, comprising the following steps:
    forming a groove on a substrate by etching;
    forming at least one first electrode on the substrate formed with the groove in such a way that at least one portion of the first electrode is formed within the groove;
    forming a first protection layer at least on the portion of the first electrode formed within the groove; and
    forming at least one second electrode on the first protection layer, wherein the second electrode has a different extending direction from that of the first electrode, and there is an intersecting area between a vertical projection of the second electrode on the substrate and a vertical projection of the at least one portion of the first electrode formed within the groove on the substrate,
    wherein the substrate is only provided with a groove at the intersecting area between the first electrode and the second electrode, in which groove a portion of the first electrode located within the intersecting area is received, with other portions of the first electrode being formed on a surface of the substrate rather than being formed into the substrate, and the first electrode and the second electrode are provided without any interruption in the intersecting area.

13. The method according to claim 12, wherein the first protection layer is formed within the groove.

14. The method according to claim 12, wherein an area of the first protection layer is at least larger than an area of the intersecting area.

* * * * *